(12) United States Patent
Go (10) Patent No.: US 11,810,263 B2
(45) Date of Patent: Nov. 7, 2023

(54) SYSTEM, METHOD, AND COMPUTER PROGRAM PRODUCT FOR MANUFACTURING A CUSTOMIZED PRODUCT

(71) Applicant: Baru Inc., Elyria, OH (US)

(72) Inventor: Augustine K. Go, Elyria, OH (US)

(73) Assignee: Baru, Inc., Elyria, OH (US)

( * ) Notice: Subject to any disclaimer, the term of this patent is extended or adjusted under 35 U.S.C. 154(b) by 0 days.

(21) Appl. No.: 17/571,154

(22) Filed: Jan. 7, 2022

(65) Prior Publication Data

US 2023/0128629 A1   Apr. 27, 2023

Related U.S. Application Data

(63) Continuation of application No. 16/439,831, filed on Jun. 13, 2019, now Pat. No. 11,257,297.

(51) Int. Cl.
| | |
|---|---|
| *G06T 19/20* | (2011.01) |
| *G06T 19/00* | (2011.01) |
| *G06Q 30/0601* | (2023.01) |
| *G06Q 50/04* | (2012.01) |

(52) U.S. Cl.
CPC ......... *G06T 19/20* (2013.01); *G06Q 30/0621* (2013.01); *G06Q 30/0643* (2013.01); *G06Q 50/04* (2013.01); *G06T 19/006* (2013.01); *G06T 2200/08* (2013.01); *G06T 2200/24* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 2014/0232734 | A1* | 8/2014 | Nigam | G06Q 30/0621 345/584 |
| 2015/0029182 | A1* | 1/2015 | Sun | G06V 20/176 345/419 |
| 2015/0055085 | A1* | 2/2015 | Fonte | G02C 7/027 700/98 |
| 2015/0332511 | A1* | 11/2015 | Jovanovic | G06F 3/0488 345/427 |
| 2015/0347366 | A1* | 12/2015 | Irwin | G06T 19/20 715/231 |
| 2016/0104235 | A1* | 4/2016 | Benkar | H04N 9/3185 705/27.2 |
| 2016/0299360 | A1* | 10/2016 | Fonte | G02C 7/028 |
| 2017/0085733 | A1* | 3/2017 | Ilic | H04N 13/271 |
| 2018/0336732 | A1* | 11/2018 | Schuster | G06T 19/006 |
| 2019/0021426 | A1* | 1/2019 | Barnes | G06Q 30/0643 |

* cited by examiner

*Primary Examiner* — Hilina K Demeter
(74) *Attorney, Agent, or Firm* — Brian Trotter (57) ABSTRACT

A system for manufacturing a customized product includes at least one processor programmed and/or configured to: display an image of a first product having first dimensions on a user interface of a computing device of a user; receive an augmented reality or virtual reality (AR/VR) request; in response to receiving the AR/VR request, capture image data from an image capturing device of the computing device and display the image data on the computing device; overlay the image of the first product over a portion of the image data captured by the image capturing device; and resize the overlaying image of the first product based on user input from a computing device of the user, such that second dimensions are associated with the first product.

16 Claims, 8 Drawing Sheets

SYSTEM, METHOD, AND COMPUTER PROGRAM PRODUCT FOR MANUFACTURING A CUSTOMIZED PRODUCT

CROSS-REFERENCE TO RELATED APPLICATIONS

This application claims priority to U.S. patent application Ser. No. 16/439,831, filed Jun. 13, 2019, the disclosure of which is hereby incorporated in its entirety by reference.

BACKGROUND

1. Field

The disclosure relates to manufacturing a customized product and, in some non-limiting embodiments or aspects, to a system, method, and computer program product for manufacturing a customized product.

2. Technical Considerations

Traditionally, manufacturers and retailers rely on mass production methods for economies of scale to minimize the per-unit costs of goods manufactured. However, the mass production of goods introduces other economic inefficiencies associated with inventory and the subsequent distribution costs of inventory handling, storage, and shipping. In many industries that use offshore production facilities, the mass production method may require 12 to 18 months from the start of designing a product to the delivery of that product to customers.

SUMMARY

Accordingly, and generally, provided is an improved system, method, and computer program product for manufacturing a customized product.

According to some non-limiting embodiments or aspects, a system for manufacturing a customized product includes at least one processor programmed and/or configured to: display an image of a first product having first dimensions on a user interface of a computing device of a user; receive an augmented reality or virtual reality (AR/VR) request; in response to receiving the AR/VR request, capture image data from an image capturing device of the computing device and display the image data on the computing device; overlay the image of the first product over a portion of the image data captured by the image capturing device; and resize the overlaying image of the first product based on user input from a computing device of the user, such that second dimensions are associated with the first product.

In some non-limiting embodiments or aspects, the at least one processor may be further programmed or configured to communicate a manufacturing request to a manufacturing system, the manufacturing request including product data associated with the first product, the product data including the second dimensions. The manufacturing system may be associated with a manufacturer proximate a location associated with the user compared to other available manufacturers. The manufacturing system may be associated with a manufacturer having a shorter wait time compared to other available manufacturers, where the wait time is defined as a time between the manufacturing request and a projected delivery date. The at least one processor may be further programmed or configured to restrict resizing of the overlaying image of the first product based on manufacturing capabilities of a manufacturing system.

In some non-limiting embodiments or aspects, the image data may include a still image or a live video captured by the image capturing device. The still image or the live video may be of a room. The first product may include a hard good. The first product may include furniture. The computing device may include a desktop computer, a laptop computer, a smartphone, a tablet computer, or an augmented or virtual reality headset. The image capturing device may be an integrated component of the computing device. The at least one processor may be further programmed or configured to generate an output file including product data associated with the first product, the product data including the second dimensions. The overlying image of the first product may be resized by enabling the user to manipulate at least one dimension of a 3D model of the first product. The at least one processor may be further programmed or configured to display at least one customizable feature option for association with the first product.

In some non-limiting embodiments or aspects, the image data may include a still image or a live video captured by the image capturing device. The still image or the live video may be an imaging scan of specific body part of a patient. The patient may be a human or a domesticated or wild animal. The first product may include specific bone, cartilage or other tissue. The first product may be an artificial joint or limb. The computing device may include a desktop computer, a laptop computer, a smartphone, a tablet computer, or an augmented or virtual reality headset. The image capturing device may be an integrated component of the computing device or a separate device. The at least one processor may be further programmed or configured to generate an output file including product data associated with the first product, the product data including the second dimensions. The overlying image of the first product may be resized by enabling the user to manipulate at least one dimension of a 3D model of the first product. The at least one processor may be further programmed or configured to display at least one customizable feature option for association with the first product.

According to some non-limiting embodiments or aspects, a method for manufacturing a customized product includes: displaying, with at least one processor, an image of a first product having first dimensions on a user interface of a computing device of a user; receiving, with at least one processor, an augmented reality or virtual reality (AR/VR) request; in response to receiving the AR/VR request, capturing, with at least one processor, image data from an image capturing device of the computing device and displaying, with at least one processor, the image data on the computing device; overlaying, with at least one processor, the image of the first product over a portion of the image data captured by the image capturing device; and resizing, with at least one processor, the overlaying image of the first product based on user input from a computing device of the user, such that second dimensions are associated with the first product.

In some non-limiting embodiments or aspects, the method may include communicating, with at least one processor, a manufacturing request to a manufacturing system, the manufacturing request including product data associated with the first product, the product data including the second dimensions. The method may include restricting resizing of the overlaying image of the first product based on manufacturing capabilities of a manufacturing system. Resizing the overlying image of the first product may include enabling the user to manipulate at least one dimension of a 3D model of the first product. The method may include displaying, with at least one processor, at least one customizable feature option for association with the first product.

According to some non-limiting embodiments or aspects, a computer program product for manufacturing a customized product, the computer program product includes at least one non-transitory computer-readable medium including one or more instructions that, when executed by at least one processor, cause the at least one processor to: display an image of a first product having first dimensions on a user interface of a computing device of a user; receive an augmented reality or virtual reality (AR/VR) request; in response to receiving the AR/VR request, capture image data from an image capturing device of the computing device and display the image data on the computing device; overlay the image of the first product over a portion of the image data captured by the image capturing device; and resize the overlaying image of the first product based on user input from a computing device of the user, such that second dimensions are associated with the first product.

Further embodiments or aspects are set forth in the following numbered clauses:

Clause 1: A system for manufacturing a customized product, comprising at least one processor programmed and/or configured to: display an image of a first product having first dimensions on a user interface of a computing device of a user;
receive an augmented reality or virtual reality (AR/VR) request; in response to receiving the AR/VR request, capture image data from an image capturing device of the computing device and display the image data on the computing device; overlay the image of the first product over a portion of the image data captured by the image capturing device;
resize the overlaying image of the first product based on user input from a computing device of the user, such that second dimensions are associated with the first product; and
in response to the user initiating an order for the first product having the second dimensions, generate and communicate a user-customized manufacturing request to a manufacturing system to cause the manufacturing system to produce the first product having the second dimensions, wherein the user-customized manufacturing request includes product data associated with the first product, the product data including the second dimensions, and includes a user-specified customization parameter.
wherein the at least one processor is further programmed or configured to restrict resizing of the overlaying image of the first product based on manufacturing capabilities of the manufacturing system, wherein the first product comprises a hard good.

Clause 2: The system of clause 1, wherein the first product further comprises an artificial limb.

Clause 3: The system of clause 1, wherein the first product further comprises an artificial joint.

Clause 4: The system of clause 2 or 3, wherein the image capturing device further comprises a medical-grade X-ray device.

Clause 5: The system of clause 2 or 3, wherein the image capturing device further comprises a magnetic resonance imaging machine.

Clause 6: The system of clause 1, wherein the user-specified customization parameter directs the manufacturing system to select a manufacturing location which uses sustainable materials.

Clause 7: The system of clause 1, wherein the user-specified customization parameter directs the manufacturing system to select a manufacturing location which is a carbon-neutral facility.

Clause 8: The system of clause 1, wherein the first product further comprises a hard good comprised of metal materials.

Clause 9: The system of clause 1, wherein the first product further comprises a hard good comprised of composite materials.

Clause 10: The system of clause 1, wherein the first product further comprises a hard good comprised of ceramic materials.

Clause 11: A method for manufacturing a customized product, comprising:
displaying, with at least one processor, an image of a first product having first dimensions on a user interface of a computing device of a user;
receiving, with at least one processor, an augmented reality or virtual reality (AR/VR) request;
in response to receiving the AR/VR request, capturing, with at least one processor, image data from an image capturing device of the computing device and displaying, with at least one processor, the image data on the computing device;
overlaying, with at least one processor, the image of the first product over a portion of the image data captured by the image capturing device;
resizing, with at least one processor, the overlaying image of the first product based on user input from a computing device of the user, such that second dimensions are associated with the first product; and
in response to the user initiating an order for the first product having the second dimensions, generating and communicating, with at least one processor, a manufacturing request to a manufacturing system to cause the manufacturing system to produce the first product having the second dimensions, wherein the manufacturing request includes product data associated with the first product, the product data including the second dimensions,
wherein the generating and communicating a manufacturing request to a manufacturing system further comprises selecting a manufacturing location,
wherein the method further comprises restricting resizing of the overlaying image of the first product based on manufacturing capabilities of the manufacturing system,
wherein the first product comprises a hard good.

Clause 12: The method of clause 11, wherein selecting a manufacturing location further comprises selecting the manufacturing facility proximate a location associated with the user compared to other available manufacturers.

Clause 13: The method of clause 11, wherein selecting a manufacturing location further comprises selecting the manufacturing facility having a shorter wait time compared to other available manufacturers, wherein the wait time is defined as a time between the manufacturing request and a projected delivery date.

Clause 14: The method of clause 11, wherein selecting a manufacturing location further comprises selecting a manufacturing location based on a user-customized parameter.

Clause 15: The method of claim 14, wherein the user-customized parameter specifies selection of a manufacturing location which uses sustainable materials.

Clause 16: The method of claim 14, wherein the user-customized parameter specifies selection of a manufacturing location which is a carbon-neutral facility.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the non-limiting exemplary embodiments that are illustrated in the accompanying schematic figures, in which.

DETAILED DESCRIPTION

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer (e.g., a laptop computer or tablet computer), a wearable device (e.g., augmented or virtual reality headset, watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a method, system, and computer program product for manufacturing a customized product. Non-limiting embodiments or aspects connect customer retail systems and manufacturing processes to increase operational flexibility and reduce supply chain costs compared to traditional retail channels (e.g., for hard goods). Non-limiting embodiments or aspects enable a user to resize dimensions of the product, allowing the product to be customized for the dimensions of the user's space. The user is further enabled to select customizable features associated with the product for further customization of the product. Non-limiting embodiments or aspects utilize AR/VR to enable the user to virtually visualize the product in the user's space and resize the object virtually in the AR/VR environment. This feature further allows the user to visualize how the product looks in the user's space. Non-limiting embodiment or aspects engage manufacturing systems to maximize efficiency and allow the user to receive the customized good faster. Thus, the present disclosure combines customer retail systems and manufacturing processes to provide a shopping experience for customization of manufactured hard goods. The system, method, and computer program product also increase efficiency by eliminating the need for finished goods inventory, and localizing production to minimize shipping costs and time until delivery.

Further, non-limiting embodiments or aspects and streamline the manufacturing and distribution process for custom configured products. Each product offered for sale may be backed by a parameter-driven 3D computer aided design (CAD) model and machine-ready manufacturing code (e.g. computer-aided manufacturing, CAM). Each 3D model can be manipulated by the customer for components and size. The final configuration may be associated with machine-ready CAM code to drive the computer numerical controlled (CNC) machinery. CNC automation keeps cost-per-unit at mass production levels while manufacturing individualized pieces to order. When a customer order is placed, the machine code may be sent to the production facility best located to minimize fulfillment costs.

In some non-limiting embodiments or aspects, multiple technologies may be combined into an integrated method, system, and computer program product. Those technologies may include internet commerce and messaging, augmented reality and virtual reality interfaces, computer aided design, and CNC manufacturing machinery. Integration of the separate technologies into a single e-commerce method allows for cost savings. Direct interaction with customers is further useful to discover their desires and needs. Direct customer interaction is used to improve advertising, product design, and production planning. Non-limiting embodiments or aspects shorten the fulfillment cycle relative to the traditional supply chain and retail channel (compare FIG. 1A to FIG. 1B).

Non-limiting embodiments or aspects include linking e-commerce systems and computer numeric controlled (CNC) manufacturing equipment to produce custom hard goods for retail customers. Subsystems that may be included comprise the following: e-commerce methods, CAD 3D modeling and CAM software, a user interface for control of customization, CNC manufacturing machines, and delivery services.

In some non-limiting embodiments or aspects, the CNC equipment receives the CAM software instructions necessary to produce the goods from the customers' instructions inputted into a user control interface. The user control interface may comprise various means of information input not limited to the following: a website's configuration controls, augmented reality devices, or virtual reality devices. In the control interface, a customer manipulates and customizes a computer aided design (CAD) 3D model. Customer-driven iterations of the 3D model are associated either directly or indirectly with the CNC equipment CAM instructions. These features all increase the efficiency of manufacturing a customized product.

Finalization of the customization process and submission of the customer's purchase order triggers the transmission of the CNC machine CAM instructions to the production facility most ideally located with respect to the customer. The machine-ready CAM code for the production automation and the proximity of the production facility to the customer increases economic and operational efficiencies over other retailers of similar products.

Figure 1A:
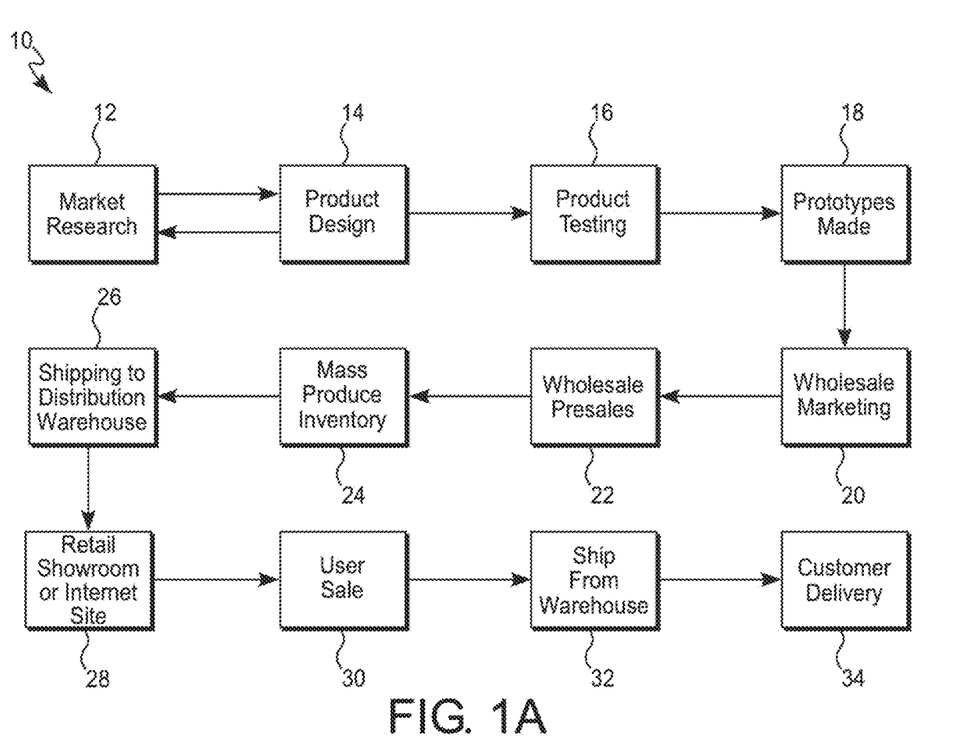
FIG. 1A shows a process flow diagram for a method of manufacturing a product according to the prior art.

Referring to FIG. 1A, a method 10 of manufacturing a product according to the prior art is shown. This method 10 illustrates how inefficient and time consuming existing method for mass producing products is. Starting at the market research 12 and product design 14, businesses begin to spend cash to develop products. They market test product designs 16 multiple ways to reduce the risk of mass-producing inventory that may not sell profitably, including getting wholesale purchase commitments at trade shows. The method further includes making prototypes 18, wholesale marketing 20, wholesale presales 22, mass producing inventory 24, shipping to distribution warehouses 26, retail of the product at a retail showroom or internet site 28, sale of the product to the user 30, shipping the product from the distribution warehouse 32, and, finally, product delivery to the customer 34. The prior art process is financially and operationally inefficient.

Figure 1B:
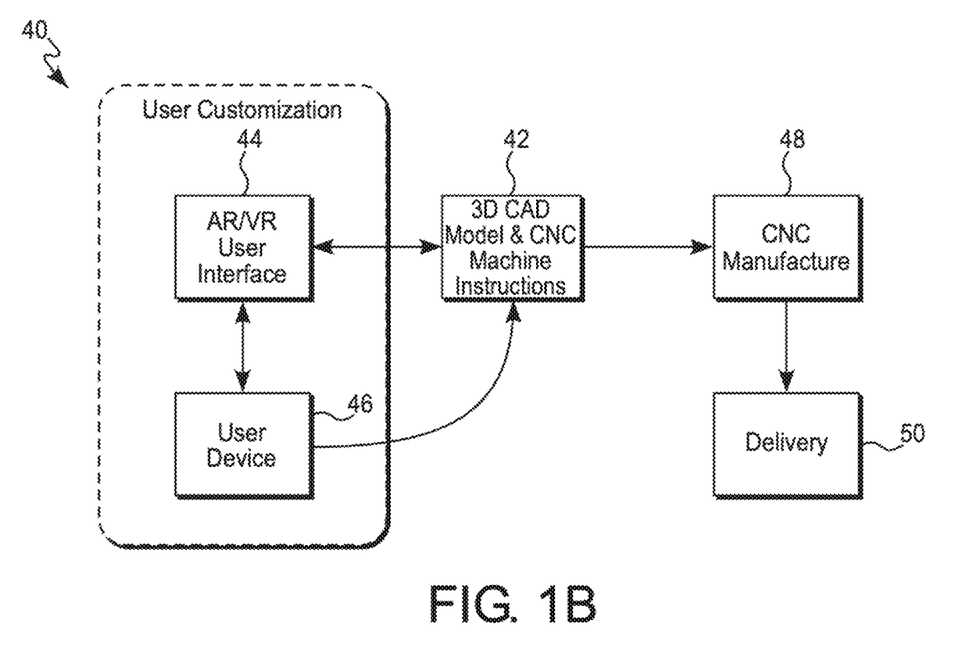
FIG. 1B shows a process flow diagram for a method of manufacturing a product according to some non-limiting embodiments or aspects.

Referring to FIG. 1B, a method 40 of manufacturing a product according to some non-limiting embodiments or aspects is shown. The method 40 may include just-in-time and on-demand production of finished goods with customer interaction and parameter control. Substantial time savings and economic efficiencies are gained compared to the prior art (see FIG. 1A) and the customer is enabled to personalize their purchase. By compressing the supply chain into three steps: retail order, manufacturing, and local delivery. The method 40 reduces the business' financial cash cycle (from the initial expense to customer payment) to days rather than months.

The product may be a customized product, such as a customized hard good. The hard good may include household items, such as furniture and other decorative objects (e.g., chair, sofa, bookshelf, table, mirror, and the like). The method 40 may include and/or utilize an e-commerce shopping platform that allows a user device 46 to order the customized product, CAD 3D modeling and CAM software 42 capable of generating CNC machine instructions, augmented and/or virtual reality software 44 to enable a user to virtually see the product in a space of the user, CNC machinery 48, and a logistics/distribution system 50 to enable efficient delivery as described below.

Figure 1C:
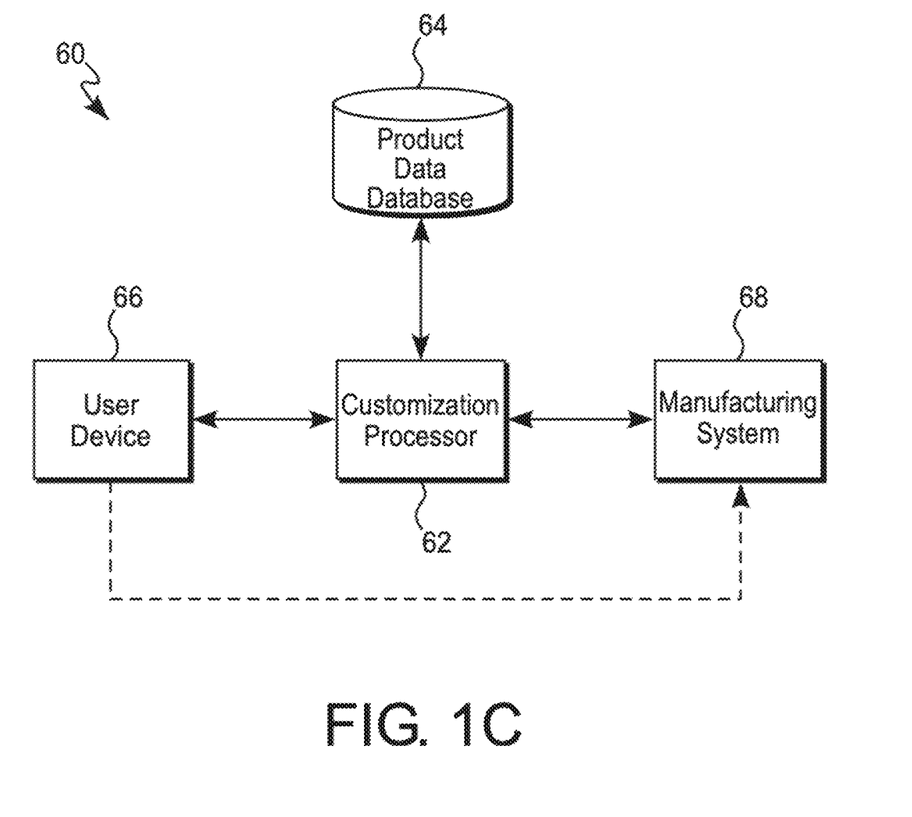
FIG. 1C shows a schematic view of a system for manufacturing a product according to some non-limiting embodiments or aspects.

Referring to FIG. 1C, a system 60 for manufacturing a customized product according to some non-limiting embodiments or aspects is shown. The system 60 may include a customization processor 62 which may be in communication with a product data database 64. The product data database 64 may include data associated with the various products that are customizable by the user to order. The data stored in the product data database may include a 3D CAD model and CNC machine manufacturing CAM instructions associated with the products. This data may include the initial dimensions associate with the products and constraints on the dimensions, such that the user may customize the product within manufacturing capabilities of a manufacturing system 68 for manufacturing the customized product (having customized second dimensions).

With continued reference to FIG. 1C, the user device 66 may communicate with the customization processor 62. In some non-limiting embodiments or aspects, the customization processor 62 may be an integrated part of the user device 66. This communication may include the customization processor 62 causing an image associated with a customizable product to be displayed on the user device 66 such that the user may customize the dimensions of the product using the user device 66.

The user may utilize the VR/AR technology as described hereinafter to customize the dimensions of the product using the user device 66.

In response to the user customizing the dimensions of the product using the user device, the user device 66 may communicate data associated with the customized product (e.g., the customized dimensions) to the customization processor 62. The customization processor 62 may communicate data associated with the customized product, such as CNC machine manufacturing CAM instructions to cause the manufacturing system 68 to manufacture the customized product for the user. The customization processor 62 may determine which manufacturing system 68 capable of manufacturing the customized product to send the data associated with the customized product to initiate manufacturing of the customized product. In some non-limiting embodiments or aspects, the user device 66 may directly communicate data associated with the customized product (e.g., the customized dimensions) to the manufacturing system 68.

E-Commerce Shopping Platforms

The method, system, and computer program product may use internet-based e-commerce systems and integrate a user product customization interface. The customization interface may be through a website configurator, an augmented reality device, virtual reality device, or other data input means. Possible controller devices may be a smartphone, computer tablet, augmented or virtual reality headset, or other electronic input device.

The customer interface may assist with configuration of the product and visualization of the product, which is represented by a 3D CAD model. Each 3D CAD model may also be associated with CNC machine manufacturing CAM instructions.

The customer (also referred to as a user herein) interaction enables gathering of customer configuration data for product development purposes, targeted advertising, and marketing analyses.

Figure 3:
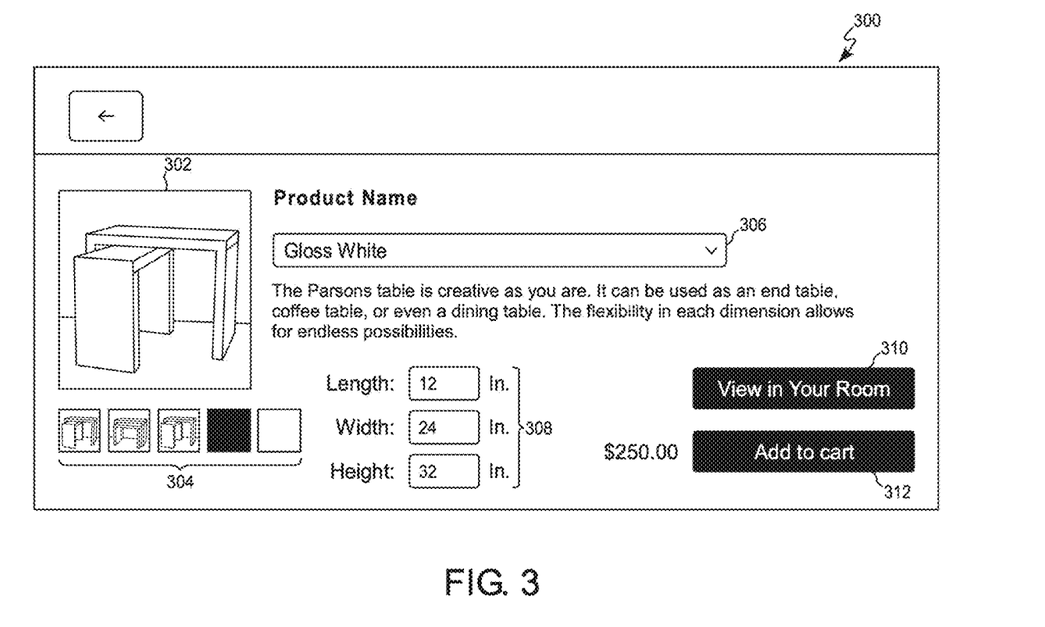
FIG. 3 shows a user interface enabled with an option for parametric controls for the dimensions of a table according to some non-limiting embodiments or aspects.

FIG. 3 shows one non-limiting embodiment of a user interface 300 enabled with an option for parametric controls, which may be part of an E-commerce shopping platform. The user interface 300 may be available to be accessed by a computing device (e.g., the controller devices described above), such as via an internet website or a mobile application. The user interface 300 may display an image 302 of a first product (e.g., the hard good), such as the table shown in FIG. 3. The user interface 300 may display first dimensions 308 associated with the first product, and these dimensions may be altered by the user by inputting new dimensions into the user interface 300, such that second dimensions are associated with the first product. The values of the second dimensions may be restricted based on manufacturing capabilities of a manufacturing system, such as hardware used to manufacture the first product. In this way, only dimensions of a product capable of being produced by the manufacturing system may be entered by the user.

Other customizable features of the first product may be specified on the shopping platform, such as first product color and finish type, addition of optional components (e.g., additional hardware components and finishes thereof), and the like. The user interface 300 may display 304 at least some of the customizable features. The user interface 300 may include a selectable option 306 to allow a user to select the customizable feature.

The user interface 300 may be used to allow the user to order the resized first product, such as using an "add to cart" feature 312, such that the manufacturing system may produce the first product having the second dimensions specified by the user. This allows the user to receive the first product in the custom size.

CAD 3D Modeling and CAM Software

Figure 2:
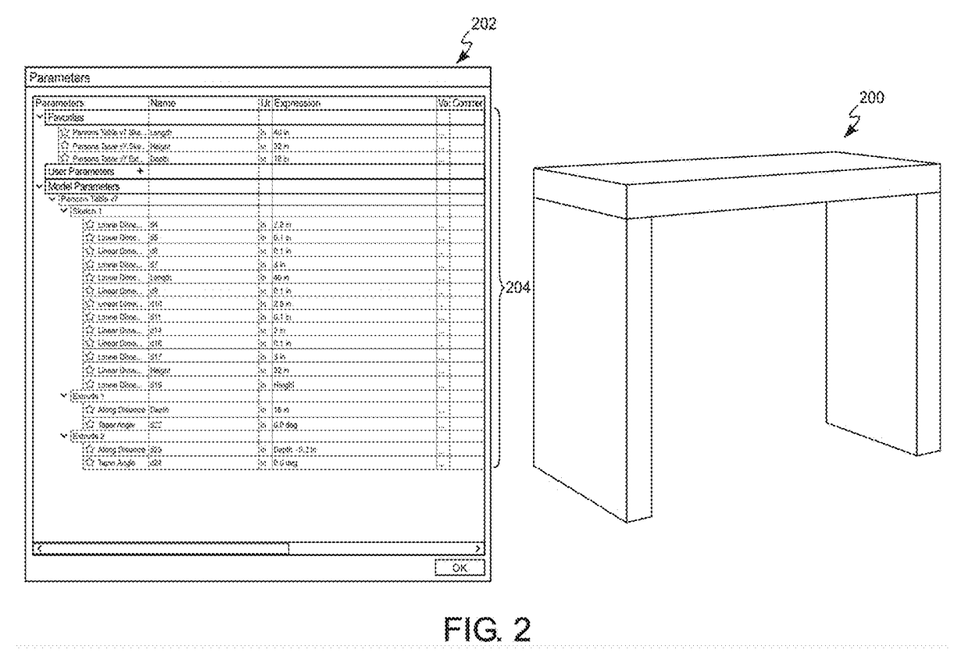
FIG. 2 shows a 3D CAD model of a table designed with parametric controls for the length, height, and depth according to some non-limiting embodiments or aspects.

Referring to FIG. 2, CAD 3D models 200 may be designed in tandem with the CNC production machinery CAM instructions and machinery constraints 202. Each CNC production machinery CAM instructions 202 may include parameters 204, and at least a portion of the parameters 204 may be size adjustable (height, width, and depth) associated with the CAD 3D model 200. The CNC machinery's operational limits may constrain the model design so that customer changes in any dimensional variable are still able to be manufactured by the machinery.

Various modular components may be exchanged in the 3D models to change the aesthetic attributes of the product. Modular components may also be changed or substituted in the 3D model to comply with manufacturing or other physical constraints or rules.

Each customer-configured iteration of the 3D model 200 may be associated with the necessary CNC machine CAM instructions 202 for automated manufacturing.

Each 3D model 200 may also be translated into different CNC machine CAM instructions 202 for different CNC machines.

FIG. 2 shows one example of the parametric 3D model 200 associated with a table (a first product). The parametric 3D model 200 includes default dimensions associated with the first product and also includes information regarding how the various dimensions of the first product may be altered by a user (e.g., limits of various dimensions or limits of proportions of various dimensions with respect to other dimensions). These dimensional restrictions may be based on manufacturing capability of the hardware of the manufacturing system, limitations associated with the materials used to build the first product (e.g., tensile strength, compressive strength, strain, yield strength, fatigue strength, impact strength, elasticity, and the like), and/or other relevant factors.

Augmented Reality and Virtual Reality

As shown in FIG. 3, the user interface 300 may include a selectable option 310 (e.g., "view in your room" button) that allows the user to submit an augmented reality or virtual reality (AR/VR) request. The integration of augmented and virtual reality assists the customer with configuration and sizing of the products (visualized as 3D CAD model representations). The AR/VR request allows the user to see the product in his/her room to help make a more informed shopping decision as to whether the product is of the proper size (or can be made of the proper size) and whether the product matches the decorations/design of the room.

The method may use the Unity gaming software engine for the customer interface, though the method is not limited to Unity or any other specific software.

In some non-limiting embodiments or aspects, the user may submit an AR/VR request to communicate with an image capturing device associated with the computing device. The image capturing device may be a camera integrated as a component of a smartphone or other computing device. The image capturing device of the computing device may capture image data of the surroundings, such as the room in which the computing device is in. The image data captured may be a still photo of the room, such as of a portion of the room or a panoramic view of the room. The image data captured may be a live video that streams and updates as the user moves the computing device about the room.

Figure 4:
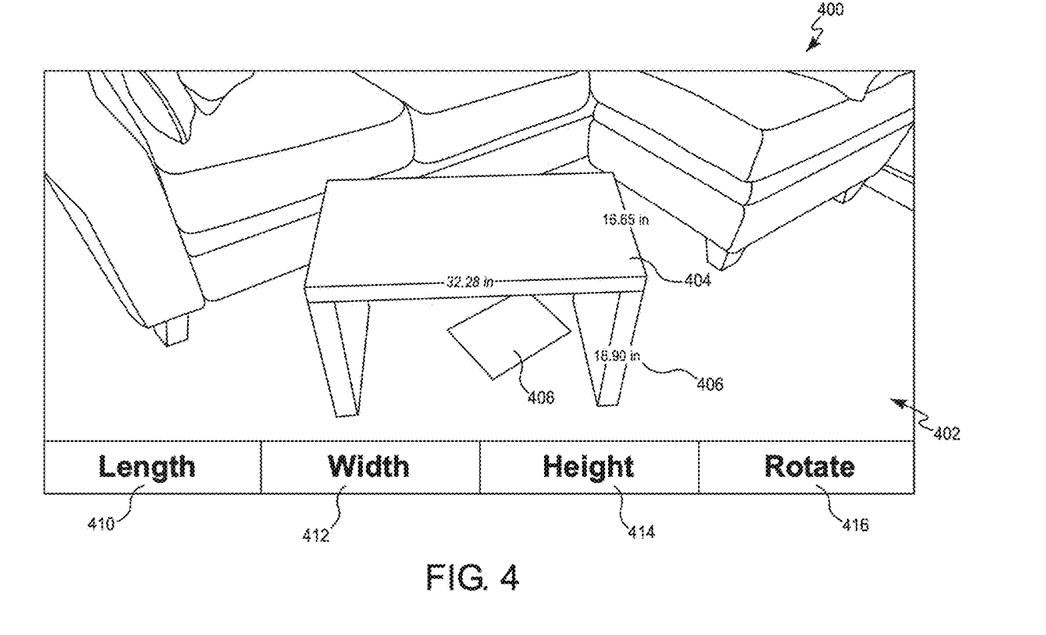
FIG. 4 shows a user control interface according to some non-limiting embodiments or aspects.

FIG. 4 shows one non-limiting example of a user control interface 400 displaying image data taken by a computing device of a room 402 having a sofa. The image of the first product 404 (the table) may be overlayed over a portion of the image data of the room 402, with the first dimensions 406 of the first product 404 being displayed so that the user can see the dimensions of the first product 404. The first product 404 may be overlayed over the image data such that its dimensions match the dimensions of the room 402 so that an accurate depiction of the first product 404 in the room 402 is displayed. The first product dimensions may be matched to those of the room 402 using a reference point 408, such as the reference sheet on the floor of the image data of the room 402 in FIG. 4; however, other methods of ensuring that the dimensions of the product match the dimensions shown in the room 402 may be used.

With continued reference to FIG. 4, the user may resize the first product 404 as the first product is displayed overlayed over the image data of the room 402. This allows the user to select the desired size of the first product that best fits their room 402.

Resizing the overlayed image based on user input may associate second dimensions with the first product 404, and the user may order the resized first product 404 having the second dimensions. The first product 404 may be resized based on manufacturing capabilities of the manufacturing system, or other considerations, such that resizing is restricted to products that are capable of being manufactured. The user may resize the first product 404 by selecting an option which allows the user to adjust a length dimension 410, a width dimension 412, and/or a height dimension 414. In this non-limiting example, by the user selecting the dimension name (410, 412, 414), the user can change its value by using finger motions on the screen to zoom in or out. Along with changing the dimensions that will transfer to the purchase order, the model may dynamically change in size also. Augmented reality may help the user to visualize how the product size will correspond to the environment (room). Virtual reality may also be used as a parametric controller. Virtual reality may assist a user to understand how a configuration or size may correspond relative to their person or body size.

The image of the first product 404 may be moved to different are as throughout the image of the room 402 based on user input. Further, an option may be displayed which allows the user to rotate 416 the overlying image of the first product 404. These features allow the user to view the first product 404 as they would desire to position it in their room 402.

The user may order the resized first product 404 having the desired customized dimensions. Upon the user indicating that they would like to order the resized first product having the customized second dimensions, an output file may be generated by the system. The output file may include product data associated with the first product, and the product data may include the second dimensions. Other than the desired dimensions, the product data may include further data, such as machine instructions, materials information, color information, finish information, pricing information, and the like. The output file may be in any suitable file format for a manufacturing system to receive and ascertain the information needed to manufacture the customized first product.

To have the customized first product 404 manufactured, the system may communicate a manufacturing request to a manufacturing system. The manufacturing request may include the output file and/or the product data associated with the customized first product (having second dimensions).

Figure 5:
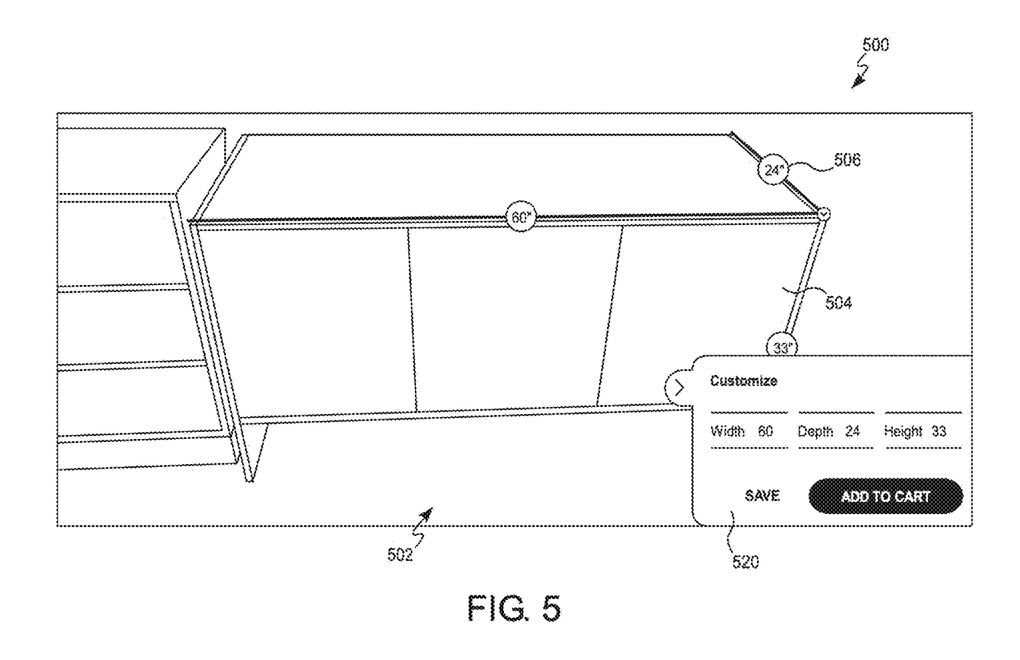
FIG. 5 shows a user control interface according to some non-limiting embodiments or aspects.

Referring to FIG. 5 another non-limiting example of a user control interface 500 displaying image data taken by a computing device of a room 502 and a product 504 (the cabinet) is shown. The dimensions 506 of the product 504 may be displayed for at least one parameter (e.g., the length, width, and/or height), and the user may be enabled to adjust at least one of the parameters. The parameters of the product 504 may be adjusted by engaging with the user interface by any suitable method. In some non-limiting examples, the user may use a mouse to increase or decrease dimensions of the product 504, such as by dragging and dropping certain portions of the product 504, or the user may use the touchscreen to effectuate the same increase or decrease dimensions of the product 504. In some non-limiting examples, a customization box 520 may be displayed which allows the user to view and edit dimensions of the product 504. It will be appreciated that other methods of resizing the displayed product 504 on the screen may be used, and different layouts of the user interface may be used.

CNC Manufacturing

CNC manufacturing machinery has become very advanced and flexible. There are numerous manufacturers and models of CNC manufacturing machinery.

Each 3D CAD model may be associated with libraries of translated CAM instructions to be usable on many CNC manufacturing machines. The appropriate machine instructions may be provided to the facility that will be manufacturing the product. In this way, the CNC manufacturing machinery may manufacture the customized first product, having the customized dimensions specified by the user.

Logistics and Distribution Efficiencies

Non-limiting embodiments or aspects may minimize delivery costs and logistics requirements by using production facilities best located with respect to the user's delivery address. Manufacturing to order eliminates most inventory and storage requirements. Other economic and operational benefits include shorter wait times, as logistical efforts are minimized.

In some non-limiting examples, the system may communicate with one or a plurality of production facilities, which include the previously described manufacturing system. These production facilities may be located at various different locations at various distances from a location of the user. The location of the user may be a listed shipping address associated with the order of the customized first product, a GPS location associated with the computing device, or any other relevant user location. In some non-limiting examples, the system may communicate the manufacturing request to the production facility most proximate to the location of the user, or one of the production facilities most proximate to the user (compared to other production facilities capable of performing the work (other available manufacturers)).

In some non-limiting examples, these production facilities may include different wait times (time between the manufacturing request being sent and a projected delivery date of the customized first product to the customer) based on the number of manufacturing products ahead of the customized first product. The system may communicate the manufacturing request to a production facility based on the expected wait time, such that a production facility having a comparatively lower wait time may receive the manufacturing request over other production facilities having higher wait times. The system may use an algorithm that considers both wait time and location of the production facilities to determine to which production facility to send the manufacturing request. The system may additionally or alternatively consider other factors in determining which production facility to send the manufacturing request. Upon completion of the customized product by the manufacturing facility, the customized product may be delivered to the user.

In a further, non-limiting embodiment or aspect, a computer program product for manufacturing a customized product includes at least one non-transitory computer readable medium including program instructions that, when executed by at least one processor, cause the at least one processor to execute one of the previously-described systems and/or methods. The at least one processor may include the customization processor or the manufacturing system.

Medical Application

Figure 6:
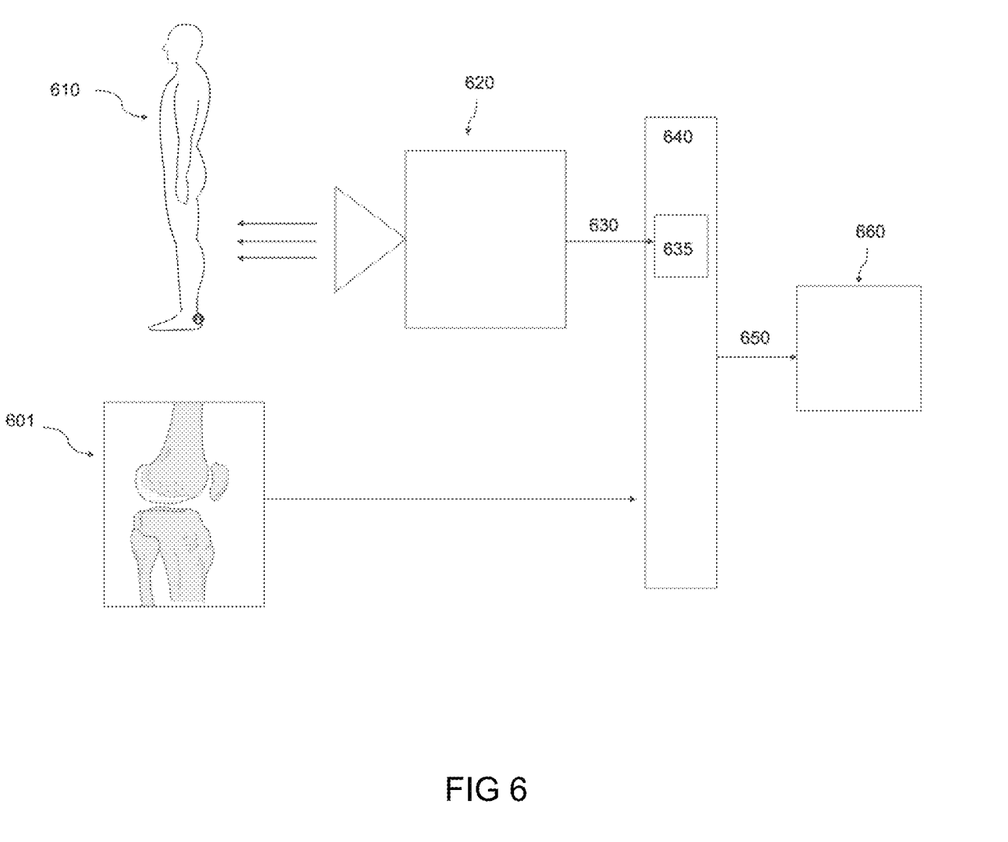
FIG. 6 shows an embodiment of the present invention for customizing an artificial limb or other medical device.

Referring to FIG. 6, in a further non-limiting embodiment or aspect, first product may be an artificial bone, limb, joint, cartilage or other tissue with a first dimension. An image representation of first product is shown as 601. Image representation 601 is shown as an artificial knee joint, but this should not be taken as limiting. Other embodiments may include other joints, bones, limbs, cartilage or other tissues as the first product. Imaging system 620 may capture an image of patient 601. Imaging system 620 may be an X-ray, MRI, CAT scan or other imaging technology. Patient 601 is shown as a human, but this should not be considered as limiting the use of the invention to other species, including but not limited to dogs, cats, horses or other domesticated or wild animals. The output 630 of imaging system 620 may be sent to at least one processor 635 programmed and/or configured to display the image representation 601 of the first product having first dimensions on a user interface of a computing device 640 of a user and overlay the output 630 of imaging system 620 onto the user interface of the computing device 640. A user of the computing device 640 may resize the dimensions of the first product to a second dimension in order to achieve a desired sizing relative to the output of imaging system 630. The second dimensions 650 of first product 601 may be sent to a manufacturing system 660 for manufacturing the first product with the second dimensions. Manufacturing system 660 may be a 3D printing system or another system for manufacturing first product to second dimensions.

In operation, the non-limiting embodiment of FIG. 6 may be practiced to create a customized artificial knee for a patient. Current solutions are limited to a fixed set of size options for the artificial knee. A custom-sized artificial joint matched to a patient's exact dimensions can lead to a superior patient experience. In operation, a standard-dimension artificial knee may be input to the system as the first product. Image representation 601 of the first product is shown as one input to computing device 640. An image of the knee of patient 601 may be captured by imaging system 620. The at least one processor may take as input the image representation 601 of the first product and overlay the image 630 of the knee of the patient 601. A user may resize the first product to a second dimension in order to match the size of first product to the size of the image of the knee of patient 601. Second dimensions 650 may be sent to manufacturing system 660 and a customized artificial knee may be manufactured to the customized second dimensions.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

I claim:

1. A system for manufacturing a customized product, comprising at least one processor programmed and/or configured to:
   display an image of a first product having first dimensions on a user interface of a computing device of a user;
   receive an augmented reality or virtual reality (AR/VR) request;
   in response to receiving the AR/VR request, capture image data from an image capturing device of the computing device and display the image data on the computing device;
   overlay the image of the first product over a portion of the image data captured by the image capturing device;
   resize the overlaying image of the first product based on user input from a computing device of the user, such that second dimensions are associated with the first product; and
   in response to the user initiating an order for the first product having the second dimensions, generate and communicate a user-customized manufacturing request to a manufacturing system to cause the manufacturing system to produce the first product having the second dimensions, wherein the user-customized manufacturing request includes product data associated with the first product, the product data including the second dimensions, and includes a user-specified customization parameter,
   wherein the at least one processor is further programmed or configured to restrict resizing of the overlaying image of the first product based on manufacturing capabilities of the manufacturing system,
   wherein the first product comprises a hard good.

2. The system of claim 1, wherein the first product further comprises an artificial limb.

3. The system of claim 1, wherein the first product further comprises an artificial joint.

4. The system of claim 1, wherein the image capturing device further comprises a medical-grade X-ray device.

5. The system of claim 1, wherein the image capturing device further comprises a magnetic resonance imaging machine.

6. The system of claim 1, wherein the user-specified customization parameter directs the manufacturing system to select a manufacturing location which uses sustainable materials.

7. The system of claim 1, wherein the user-specified customization parameter directs the manufacturing system to select a manufacturing location which is a carbon-neutral facility.

8. The system of claim 1, wherein the first product further comprises a hard good comprised of metal materials.

9. The system of claim 1, wherein the first product further comprises a hard good comprised of composite materials.

10. The system of claim 1, wherein the first product further comprises a hard good comprised of ceramic materials.

11. A method for manufacturing a customized product, comprising:
- displaying, with at least one processor, an image of a first product having first dimensions on a user interface of a computing device of a user;
- receiving, with at least one processor, an augmented reality or virtual reality (AR/VR) request;
- in response to receiving the AR/VR request, capturing, with at least one processor, image data from an image capturing device of the computing device and displaying, with at least one processor, the image data on the computing device;
- overlaying, with at least one processor, the image of the first product over a portion of the image data captured by the image capturing device;
- resizing, with at least one processor, the overlaying image of the first product based on user input from a computing device of the user, such that second dimensions are associated with the first product; and
- in response to the user initiating an order for the first product having the second dimensions, generating and communicating, with at least one processor, a manufacturing request to a manufacturing system to cause the manufacturing system to produce the first product having the second dimensions, wherein the manufacturing request includes product data associated with the first product, the product data including the second dimensions,
- wherein the generating and communicating a manufacturing request to a manufacturing system further comprises selecting a manufacturing location,
- wherein the method further comprises restricting resizing of the overlaying image of the first product based on manufacturing capabilities of the manufacturing system,
- wherein the first product comprises a hard good.

12. The method of claim 11, wherein selecting a manufacturing location further comprises selecting the manufacturing facility proximate a location associated with the user compared to other available manufacturers.

13. The method of claim 11, wherein selecting a manufacturing location further comprises selecting the manufacturing facility having a shorter wait time compared to other available manufacturers, wherein the wait time is defined as a time between the manufacturing request and a projected delivery date.

14. The method of claim 11, wherein selecting a manufacturing location further comprises selecting a manufacturing location based on a user-customized parameter.

15. The method of claim 14, wherein the user-customized parameter specifies selection of a manufacturing location which uses sustainable materials.

16. The method of claim 14, wherein the user-customized parameter specifies selection of a manufacturing location which is a carbon-neutral facility.

* * * * *